June 21, 1955 S. B. TALLMAN 2,711,037
RESILIENTLY MOUNTED BAR TYPE GATE
Filed April 6, 1954 2 Sheets-Sheet 1
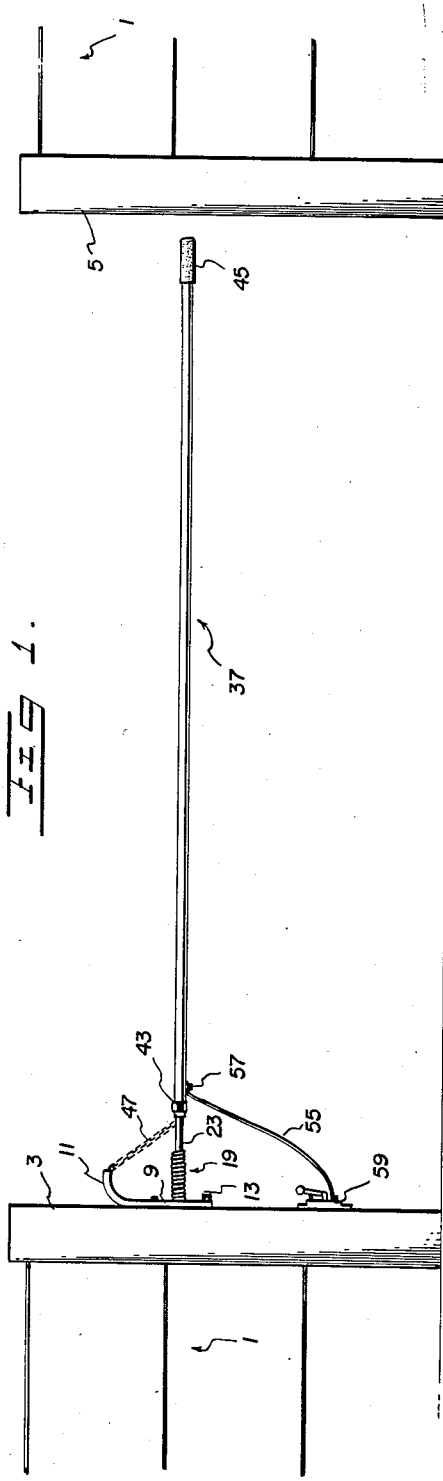
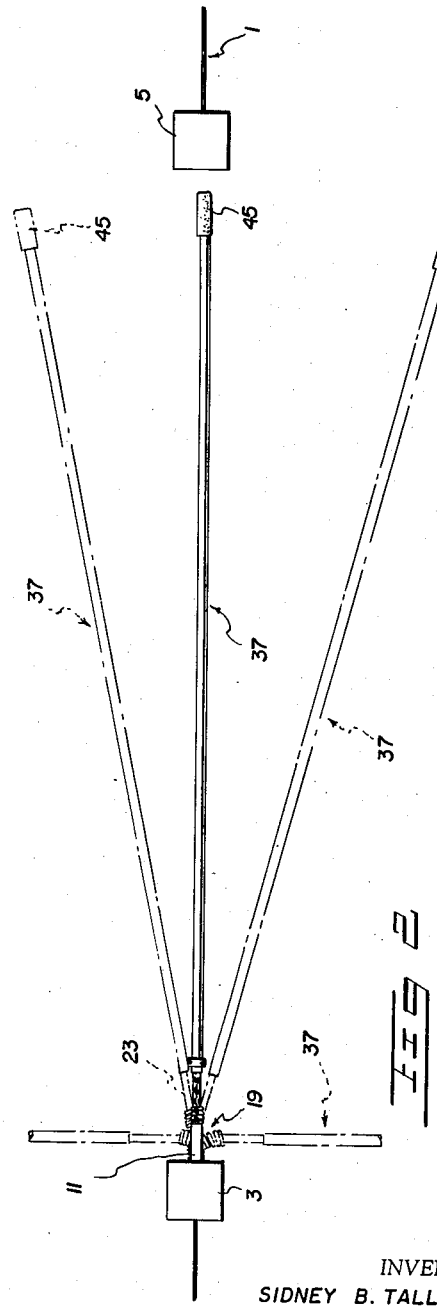
INVENTOR
SIDNEY B. TALLMAN.
BY
ATTORNEYS June 21, 1955   S. B. TALLMAN   2,711,037
RESILIENTLY MOUNTED BAR TYPE GATE
Filed April 6, 1954   2 Sheets-Sheet 2
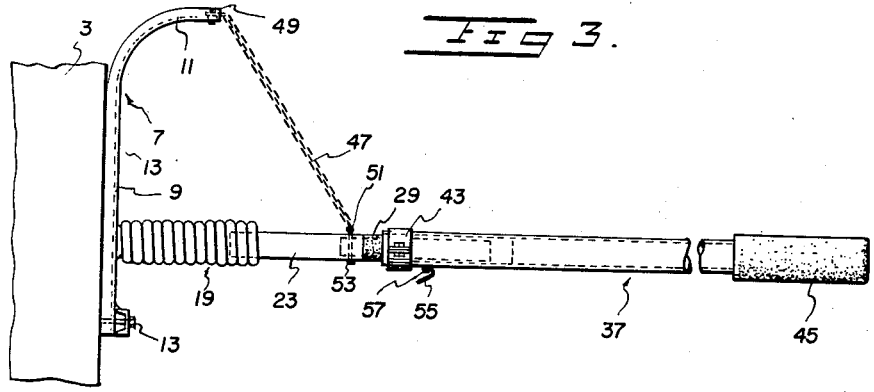
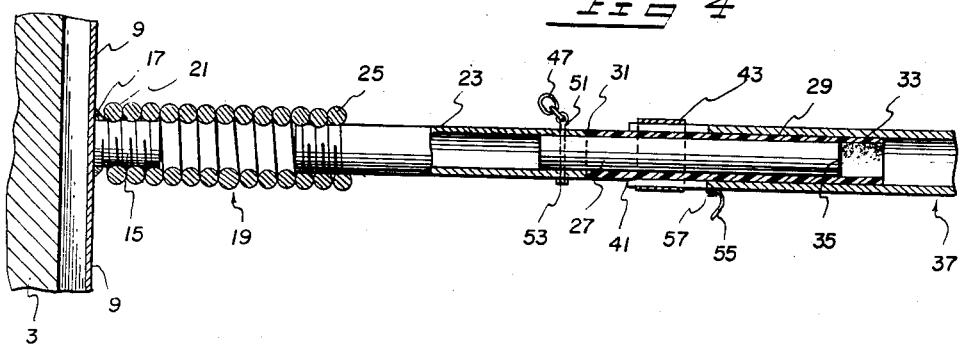
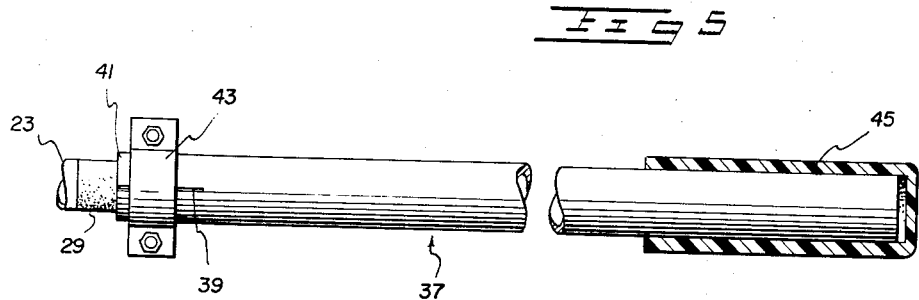
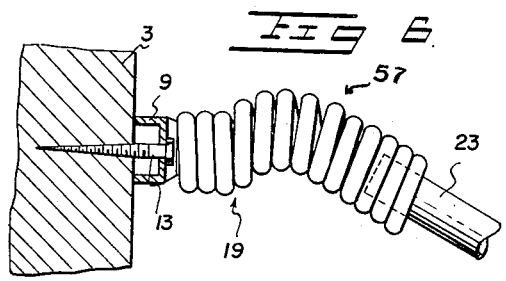
INVENTOR
SIDNEY B. TALLMAN.
BY Peck & Peck
ATTORNEYS United States Patent Office 2,711,037
Patented June 21, 1955

2,711,037

RESILIENTLY MOUNTED BAR TYPE GATE

Sidney B. Tallman, Genoa, N. Y.

Application April 6, 1954, Serial No. 421,250

7 Claims. (Cl. 39—92)

This invention relates broadly to the art of electrified gates and in its more specific aspects it relates to an electrified gate designed particularly for farm use which is operable to permit passage of vehicles past the gate without requiring the driver to dismount, while subjecting an animal which comes in contact with the gate to an electric shock to deter the passage of the animal past the gate; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

The electrified gate which I have devised has been particularly designed for barring passage to farm or other animals while permitting the passage of vehicles along the way guarded by the gate and past the gate without requiring the driver of the vehicle to dismount to manually open the gate. The gate is advantageously used to bar the passage of animals from barnyard, livestock pen, field or the like and yet does not constitute a barrier preventing the passage of vehicles from such restricted animal enclosures.

One of the primary objects and purposes of my invention has been to evolve an electrified farm gate of the character of that embodied in this invention which may be economically produced and installed and will continue to operate successfully for many years following the installation thereof and under all weather conditions. It will be appreciated that a farm gate of this character in order to be practical must be produced and sold at relatively small cost and must be easily installed as well as involving relatively few operating parts so that it will require substantially no attention and repairs.

Electrified barriers or farm gates of the type with which I am now concerned are adapted to span a way or passage to prevent passage of livestock past the barrier and are swingably mounted and designed to be struck and opened by a vehicle so that it may pass by, and to automatically close or swing back to operative spanning position when the vehicle has passed by. Electrified farm gates of the general type of that which I have devised must be not only economical to produce, market, install and operate but must be endowed with the necessary characteristics so as to withstand the shock to which they are subjected when they are struck by a vehicle such as an automobile, tractor, truck or the like in order to swing the gate open and permit the vehicle to pass thereby. It will be readily appreciated that these gates which are adapted to be opened by contact with a vehicle will be struck with considerable force at times due to the carelessness of operators of vehicles who may drive into the gate or barrier at relatively high rates of speed. The electrified farm gate of this invention is designed to withstand blows from vehicles at relatively high speeds and has been constructed and assembled with this in mind.

The electrified farm gate must be capable of spanning a space of from 12 to 14 feet and it must accomplish this without sagging. I have discovered from my experience with gates of this character that the element of the gate which spans the way to prevent passage of animals must have a degree of inherent flexibility to withstand the shocks to which it will be subjected from vehicles and it must have this flexibility factor and still be capable of spanning a substantial space without sagging. Since the spanning element is electrically charged to produce an electric shock in an animal coming in contact therewith, it must be constructed of a material having good electric conductive qualities. Farm gates of this general character are normally used in the open and should be constructed of a material which will not rust and otherwise deteriorate to thereby reduce its longevity as well as its electric conductivity factor.

I have found that the spanning element of an electrified farm gate is endowed with all of these and other desirable characteristics which is formed of a tube of thin-walled drawn aluminum alloy. Such tube will be relatively light, will not be adversely affected by weather, will not sag and has the necessary flexibility to function as desired. Such an aluminum tube will remain bright, will not rust, and is a good conductor of electricity.

In order to provide a commercially practical electrified farm gate it is essential that it be fully automatic in its operation so that after being opened in any manner whatsoever it will automatically return to operative spanning position. Farm gates of this general character of which I am now aware provide various mounting arrangements such as hinges for the spanning element and springs to return it to operative position, however all of them require a substantially large number of mounting and operating elements compared with the electrified farm gate embodied in this invention. It will be evident that an advance has been made in this art by the reduction of elements without sacrificing the necessary automatic features of the gate.

I have evolved a unique and highly satisfactory mounting organization for my electrified gate which takes some of the shock to which the spanning element is subjected when struck by a vehicle, the mounting organization provides a universal mounting for the gate and it is automatically operable to return the spanning element to operative spanning position after it has been opened.

The spanning element is hingedly mounted from a support member by a novel arrangement which includes an element which not only functions as a hinge but also is of resilient construction so that it serves the dual purpose of automatically closing the gate following an opening operation as well as mounting the gate. I have achieved the above and other advantageous purposes without adding to the expense or complexity of assembly of the apparatus. As a matter of fact, the electrified farm gate of this invention is of the utmost simplicity in both its parts and the number thereof as well as in the assembly of these parts so that no unusual skills are required in the manufacture of the apparatus or in the installation thereof. Furthermore this electrified farm gate has few operating parts and none of which are of such character that they are likely under normal operation and use of the gate to get out of order.

The resilient mounting member for the spanning element is in the form of a coil spring and serves not only the functions outlined above but also functions to take up the lateral shock or inertia on the spanning element when it is struck a blow in an opening operation. Therefore, I am enabled to use a highly desirable type of relatively light and flexible spanning element which would be subject to damage in its operation without the novel mounting arrangement of this invention.

Since the spanning element is connected into an electric circuit so as to subject an animal coming in contact therewith to an electric shock it is necessary that this spanning element be insulated from the remaining parts of the apparatus. I have provided simple and efficient insulating means which also serve to add to the strength of the apparatus without substantially or materially adding to the weight thereof.

While I have described this gate as being one which may be opened by contact with a moving vehicle it will, of course, be understood that a person may swing the gate into open or any other position and I have provided an insulating means on the electrically charged spanning element so that a person may actuate the gate to open position without receiving a shock.

As will become evident as the description of my invention proceeds, I have provided a low priced efficient electrified farm gate and have been able to produce and install this gate at such low cost primarily because of the simple, fast spring mounting combined with a single spanning element so that I produce such an efficient apparatus with only one base mechanism which will span up to 14 feet.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in elevation of an installation of my gate.

Fig. 2 is a top plan view of the installation of Fig. 1 and illustrates in dotted lines the position of the spanning element and mounting organization when the spanning element is in position other than in fully spanning position.

Fig. 3 is a detailed view in elevation of my electrified farm gate.

Fig. 4 is a view in horizontal section of my electrified farm gate with parts thereof broken away.

Fig. 5 is a plan view of the spanning element of my electrified farm gate.

Fig. 6 is a detailed view of the coil spring mounting means for the spanning element, illustrating the position temporarily assumed by the coil spring at and immediately following the initiation of a swinging movement of the spanning element.

Referring to the accompanying drawings and particularly Fig. 1 thereof wherein I have illustrated one use to which my electrified farm gate may be put. In this particular example of an installation of my invention I have illustrated it as forming a barrier for a roadway, passage or the like between a fence designated in its entirety by the numeral 1 which fence may include fence posts 3 and 5 which define the opening or passageway through the fence. The supporting posts 3 provide the supporting medium for the electrified gate organization, and I mount a base supporting member designated generally by the numeral 7 on the post 3. This base supporting member 7 is preferably constructed of steel of generally channel cross section and includes an upright portion 9 and a neck portion 11 which is stamped to bend outwardly and away from the upright portion of the base 9. The base member is provided with apertures therethrough which receive lag screws or the like fastening members 13 so as to mount the base supporting member 7 in operative position on the post 3. I provide a coil spring tubular mounting member 15 which may be formed of steel and is welded or otherwise fixed as at 17 to the upright portion 9 of the base member 7. The coil spring mounting member 15 is of reduced length relative to the other members of the organization which are about to be described and constitutes in effect a stub tube coil spring mounting element. The coil spring mounting element 15 which projects outwardly a short distance from the upright portion 9 of the base member 7 provides the means whereby the gate organization including the spanning element is mounted and supported from the base 7.

The hinge and automatic return means for my electrified gate consists of a tightly wound coil spring designated in its entirety by the numeral 19. As will be apparent from the drawings, this coil spring is of substantially greater length than the length of the coil spring tubular mounting element 15. As an example, the coil spring tubular mounting element 15 may have an outside diameter of approximately .875" and the coil spring 19 is formed to have a substantially similar inside diameter so that I fixedly mount the coil spring 19 on the mounting element 15 by screwing the coils at one end of the spring against the exterior circumferential surface of the coil spring mounting element 15 so that the tubing expands the end coils of the spring slightly and permits them to be threaded on the tubular element 15. The powerful grip of the turns of the spring actually cut a groove or thread on the exterior surface of the tube to thereby produce a very strong and quickly assembled unit consisting of the coil spring 19 and the tubular element 15. With the coil spring 19 rigidly fixed on the tubular coil spring mounting element 15 the remaining turns of the spring extend outwardly from the tubular element 15 in axial alignment therewith. Consideration of the drawings and particularly Fig. 4 thereof illustrates that the coil spring is fully threaded on the tubular coil spring mounting element until the end turn 21 of the spring is in abutment with the weld 17.

I provide a tubular inner supporting and axially spacing insert 23 which may be constructed of steel or the like and is of substantially the same outside diameter as the diameter of the coil spring mounting element 15, the tubular insert 23 being of greater length than the length of the coil spring mounting element 15. This tubular insert is adapted to be mounted in the end 25 of the coil spring 19 and is screwed therein so that threads or grooves are provided on the exterior surface of the insert 23 to thereby securely and strongly fasten the insert 23 in the end 25 of the coil spring. As will be evident from the drawings, the tubular insert 23 is in axial alignment with the element 15 and the coil spring 19 and extends outwardly from the end 25 of the spring.

The electrified gate of this invention involves a further steel tubular outer supporting and axially spacing insert 27 which may be of substantially the same length as the previously described insert 23, however, the outside diameter of the outer tubular insert 27 is slightly less than the outside diameter of the inner tubular insert 23 so that an end of the outer tubular insert 27 may be received in the outer end of the inner tubular insert 23. One dimension which I have found to be satisfactory for the outer tubular insert 27 relative to the same dimension of the inner tubular insert 23 is .750" for the outside diameter of the outer tubular insert 27. Since the outer tubular insert 27 in a completed assembly must be firmly fixed with one end telescopically received with an end of the inner tubular insert 23, I have found that a quick, simple and inexpensive method of securely fastening the inserts 23 and 27 is to force them together in a hydraulic press so that a pressure fit results and I have found that ample joint strength is provided if an approximate one inch overlap between these two inserts is provided.

The length of the tubular insert 27 which extends outwardly beyond and is free of the tubular insert 23 is covered and insulated by means of an insulating sleeve 29 which is preferably of substantially the same length as the overall length of the outer tubular insert 27 and is preferably formed of a vinyl plastic which is shrunk over the outer tubular insert 27. The insulating sleeve 29 is preferably in engagement with the outer end of the inner tubular insert 23 as at 31 and since the sleeve 29 is of substantially the same length as the insert 27 there will be a portion 33 of the insulating sleeve which extends outwardly beyond the end 35 of the outer tubular insert 27. While I have mentioned using vinyl plastic as an insulating sleeve for the tubular insert 27 it will be understood that I may form the insulating sleeve of any material having suitable electrical insulating properties. It is desirable, however, to form the sleeve of a material which may be shrunk over the outer tubular insert with facility.

The numeral 37 has been utilized to designate in its entirety the spanning element of this gate organization. It is this element 37 which is adapted to extend across and span a way or passage to thereby provide a barrier against passage of animals therepast and it is this spanning element which must be endowed with the necessary inherent properties of flexibility, nonsagging, rust and weatherproof and must be formed of electric conductive material. I have found that a highly satisfactory spanning element may comprise an aluminum alloy tubing which functions as the spanning element of an electrified farm gate both economically and structurally. I preferably use a cold drawn 61 ST, 1" O. D., .065" wall thickness, Alcoa standard. While I do not wish to limit my invention to the use of this specific material for the spanning element of my gate I have found by actual experiments that a spanning element constructed of this material when mounted in a manner as defined in this invention functions in a satisfactory manner.

The tubular spanning element 37 may be provided in the proper lengths, such as 12' and 14' for spanning and providing a barrier against the passage of animals along a way or passage guarded by my gate, and the spanning element is preferably slotted at one end as at 39. In operative position in the gate organization the slotted end of the spanning element 37 is telescopically mounted on and slid over the insulating sleeve 29 until the slotted inner end 41 of the spanning element is in position spaced from the outer end of the tubular insert 23. The spanning element 37 is removably fixed on the insulating sleeve 29 by a clamping ring 43 which clamps this slotted end of the spanning element to the insulating sleeve 29 in insulated spaced relation with respect to the outer tubular insert 27. I preferably fix on the outer end of the spanning element 37 a handle-forming insulating sleeve 45 of clear vinyl plastic so that the gate may be manually swung open without subjecting the person to an electric shock.

A supporting chain or cable 47 is fixed at one end to an eye 49 which is mounted in the end of the neck portion 11 of the supporting base member 7, the chain being fixed at its other end to a pin 51 which extends through the inner tubular insert 23 and the outer tubular insert 27 where they are in telescoping position. The pin 51 may be removably mounted in the tubular inserts by means of a nut 53 which is threaded on the end thereof. Thus, the chain 47 extends from the neck 11 to the swingable portion of my gate organization. The outer end of the neck 11 where the chain is attached to the hook or eye 49 is outwardly spaced beyond the mid-point of the coil spring 19 so that the action of the spring in returning the spanning element to operative spanning position following an opening operation will be aided due to the fact that the spring will bend at substantially the midpoint thereof when the spanning element is swung and since the chain 47 is attached to the fixed neck 11 at a point slightly outwardly beyond the mid or bending point of the spring, the arc in which the spanning element swings will shorten as the gate swings open and the spanning element will swing upwardly when it is swung in either direction and will be at its lowest point when it is in operative spanning position.

The spanning element is provided with an electric charge from any suitable type electric fence charger, the spanning element being connected into the circuit in any suitable means and as one example thereof I have illustrated a cable 55 which is fastened by means of a clip 57 or in any other suitable manner to the tubular spanning element 37, the cable being connected to a knife switch 59 which in turn is connected to the electric fence charger.

In Fig. 6 of the drawings I have illustrated the reaction of the coil spring when the spanning element is struck and swung into any position other than its normal operating position which is in axial alignment with the coil spring. When the spanning element and its associated members which project axially outwardly from the coil spring is struck the spring initially and temporarily bends as at 57 in the opposite direction from the direction in which the spanning element is swung, and this opposite directional bending of the spring absorbs a degree of the force which would otherwise be completely and fully absorbed by the thin walled and relatively light alloy spanning element.

Merely by way of example and not as a limitation, the electrified gate organization may follow the following dimensions and my experiments have established that a gate built in accordance with the following structural dimensions will operate in a highly satisfactory manner.

The base supporting member or bracket 7 may be a one inch steel channel base 14" long and the neck 11 thereof may measure 4⅜" beyond the base or the innermost coil 21 of the spring 19 so that the end of the neck is 6.5" above the spring axis. The coil spring tubular mounting element 15 is constructed of steel and has an outside diameter of .875". The coil spring 19 is formed of .263" spring wire wound to .875" internal diameter and is 6.5" long. The inner tubular insert 23 is fabricated of steel and has an outside diameter of .875" and the outer tubular insert 27 is provided with an outside diameter of .750". The plastic insulating sleeve 29 is 1/16" in thickness and is shrunk over the outer tubular insert. The spanning element comprises an aluminum tube having a one inch outer diameter and, as pointed out above, is of thin walled cold drawn 61 ST, .065" wall thickness, Alcoa standard.

I have found that it is highly desirable to produce a satisfactory gate organization that the two tubular inserts 23 and 27 be used rather than one. The reason for this is that experience has established that the coil spring 19 cannot be wound on such small diameters as .750" without being weakened by some stretch breaking on the outside of the bend which is also further aggravated by the bending action which the gate produces. Thus, the tubular insert which is mounted within the spring is .875" and since the outer tubular insert must be small enough to allow the insulating sleeve to be thick enough to give positive insulation and still be a perfect fit inside the spanning element, hence it was found to be desirable to utilize two inserts rather than the single insert.

It will also be noted that my assembly insures against an improper insulation of the charged spanning element due to the fact that the outer end 31 of the inner tubular insert 23 is spacedly related to the inner end 41 of the spanning element so that there is no danger of a spark jumping the gap between these two metallic elements. Similarly the insulating sleeve 33 extends beyond the outer end 35 of the outer tubular insert 27 so that there can be no spark jump between the insert 27 and the spanning element.

It will be recognized that I have provided an arrangement for mounting a spanning element for universal swinging of the spanning element. Thus, the spanning element may be swung in any direction and may be swung upright and tied to the post to maintain it in inoperative out of the way position. The simplicity of my electrified gate organization will be evident when it is appreciated that substantially the entire operative control and mounting of the spanning element is accomplished by means of the single coil spring which extends in a lineal direction from its support and is so wound that when it is deflected at substantially its mid-point by swinging of the spanning element its tension is sufficient to return the spanning element to normal spanning position and itself to normal position extending in a lineal direction.

I claim:

1. A gate including an elongated element adapted to be electrically charged and in normal position to extend across and span a passage to subject animals coming in contact therewith to an electric shock, and means mounting said element to permit said element to be swung to open position and to automatically return said element to normal spanning position said means including a coil spring and a stationary support member extending into one end of said coil spring and fixed thereto and supporting said coil spring in normal unflexed position extending in a lineal direction therefrom, and an elongated element of supporting member received in and fixed to the other end of said coil spring and extending outwardly therefrom, the opposing ends of said stationary support member and said elongated element supporting member being spaced apart within the coil spring and said elongated element supported from said elongated element supporting member for swinging therewith, said coil spring in normal unflexed condition and said elongated element supporting member and said elongated element when in normal position being in substantial axial alignment.

2. A gate including an elongated element adapted to be electrically charged and in normal position to extend across and span a passage to subject animals coming in contact therewith to an electric shock, and means mounting said element to permit said element to be swung to open position and to automatically return said element to normal spanning position, said means including a coil spring, a tubular support member of less length than the length of the spring and of substantially the same external diameter as the internal diameter of the coil spring, said tubular support member fixed in one end of the coil spring and supporting said spring in normal unflexed position extending in a lineal direction from the tubular support member, a tubular insert of substantially the same external diameter as said tubular support member fixed in the other end of said coil spring and extending therefrom, the opposing ends of said tubular support member and said tubular insert being spaced apart within the coil spring, and said elongated element supported from said tubular insert for swinging therewith, said coil spring in normal unflexed condition and said tubular insert and elongated element when in normal position being in substantial axial alignment.

3. A gate including an elongated element adapted to be electrically charged and in normal position to extend across and span a passage to subject animals coming in contact therewith to an electric shock, and means mounting said element to permit said element to be swung to open position and to automatically return said element to normal spanning position, said means including a coil spring, a tubular support member of less length than the length of the spring and of substantially the same external diameter as the internal diameter of the coil spring, said tubular support member fixed in one end of the coil spring and supporting said spring in normal unflexed position extending in a lineal direction from the tubular support member, an inner tubular insert of substantially the same external diameter as said tubular support member fixed in the other end of said coil spring and extending therefrom, the opposing ends of said tubular support member and said inner tubular insert being spaced apart within the coil spring, an outer tubular insert having a slightly greater external diameter than the internal diameter of said inner tubular insert and said outer tubular insert fixed in the extended end of said inner tubular insert and extending therefrom, and said elongated element supported from said outer tubular insert for swinging with said inner and outer tubular inserts, said coil spring in normal unflexed condition and said inner and outer tubular inserts and the elongated element when in normal position being in substantial axial alignment.

4. A gate including an elongated electrically charged tubular element adapted in normal position to extend across and span a passage to subject animals coming in contact therewith to an electric shock, a source of electric current and means connecting said elongated tubular element to said source of electric current, and further means mounting said elongated tubular element to permit said element to be swung to open position and to automatically return said element to normal spanning position, said means including a coil spring, a tubular support member extending in said fixed to one end of the coil spring and supporting said spring in normal unflexed position extending in a lineal direction from the tubular support member, an inner tubular insert fixed in the other end of said coil spring and extending therefrom, the opposing ends of said tubular support member and said inner tubular insert being spaced apart within the coil spring, an outer tubular insert fixed in the extended end of said inner tubular insert and extending therefrom, an insulating sleeve fixed to the extended portion of said outer tubular insert and extending outwardly beyond the extended end of said outer tubular insert, and said elongated tubular element supported on said insulating sleeve and extending outwardly therebeyond, the inner end of said elongated tubular element being spaced from the extended end of said inner tubular insert, and said coil spring in normal unflexed condition and said inner and outer tubular inserts and the elongated element when in normal position being in substantial axial alignment.

5. A gate including a flexible and non-sagging tubular element adapted to be electrically charged and in normal position to extend across and span a passage to subject animals coming in contact therewith to an electric shock, and adapted to be swung to open position when struck by a relatively rapidly moving object and to withstand the shock thereof, and said tubular element being formed of cold drawn aluminum alloy with an outer diameter of approximately 1", a wall thickness of approximately .065" and a length in the range of 12' to 14', and means mounting said tubular element to permit said element to be swung to open position and to automatically return said element to normal spanning position and said means having sufficient rigidity to maintain said tubular element in substantially horizontal position when in normal spanning position, said means including a support and a coil spring fixed at one end to said support and in normal unflexed condition extending in a lineal direction from said support, said coil spring being formed of approximately .263" spring wire wound to an internal diameter of approximately .875" and the spring being approximately 6.5" in length, said tubular element supported from the other end of said coil spring, said coil spring in normal unflexed condition and said element when in normal spanning position being in substantial axial alignment.

6. A gate including an elongated element adapted to be electrically charged and in normal closed position to extend across and span a passage to subject animals coming in contact therewith to an electric shock, and means counting said element to permit said element to be swung to open position and to automatically return said element to normal spanning position, said means including a coil spring and a stationary support member extending into one end of said coil spring and fixed thereto and supporting said coil spring in normal unflexed position extending in a lineal direction therefrom, and an elongated element supporting member received in and fixed to the other end of said coil spring and extending outwardly therefrom, the opposing ends of said stationary support member and said elongated element supporting member being spaced apart within the coil spring and said elongated element supported from said elongated element supporting member for swinging therewith, said coil spring in normal unflexed condition and said element when in normal operative spanning position being in substantial axial alignment and said coil spring being initially deflectable midway between the ends thereof in that area of the spring between the opposing ends of the stationary support member and said elongated element supporting member in a direction opposite to the direction in which the elongated element is swung to thereby absorb a part of the shock applied to the elongated element in initiating the swinging movement thereof.

7. A gate in accordance with claim 6, wherein the area within the coil spring between the opposed ends of said stationary support member and elongated element supporting member is unobstructed and the area which is radially adjacent to said coil spring is unobstructed for free deflection of said coil spring in any direction dependent upon the direction in which said elongated element is swung.

References Cited in the file of this patent

UNITED STATES PATENTS

| | | |
|---|---|---|
| 2,388,625 | Wagenknecht | Nov. 6, 1945 |
| 2,426,380 | Swanson | Aug. 26, 1947 |
| 2,482,630 | Mastromarino | Sept. 20, 1949 |
| 2,493,787 | Toretti | Jan. 10, 1950 |
| 2,540,562 | Wood | Feb. 6, 1951 |
| 2,605,565 | Meyer, Jr. | Aug. 5, 1952 |
| 2,642,683 | Meyer, Jr. | June 23, 1953 |